United States Patent [19]
Blackmore

[11] Patent Number: 5,613,662
[45] Date of Patent: Mar. 25, 1997

[54] SEAT ADJUSTMENT MECHANISMS

[75] Inventor: David C. Blackmore, Wellingborough, United Kingdom

[73] Assignee: KAB Seating Limited, Northampton, United Kingdom

[21] Appl. No.: 375,296

[22] Filed: Jan. 20, 1995

[30] Foreign Application Priority Data

Jan. 21, 1994 [GB] United Kingdom ............... 9401143

[51] Int. Cl.⁶ .................................................. A47G 29/00
[52] U.S. Cl. ........................ 248/371; 248/394; 248/396; 248/398; 297/325; 297/344.15
[58] Field of Search .................................... 248/371, 396, 248/394, 398, 421; 297/344.15, 325

[56] References Cited

U.S. PATENT DOCUMENTS

| | | | |
|---|---|---|---|
| 2,161,367 | 6/1939 | McGregor et al. | 248/394 |
| 3,437,302 | 4/1969 | Homier | 248/394 |
| 3,460,793 | 8/1969 | Posh | 248/396 X |
| 3,669,398 | 6/1972 | Robinson | 248/394 X |
| 3,692,271 | 9/1972 | Homier et al. | 248/394 |
| 4,325,527 | 4/1982 | Berneking | 248/394 |
| 4,568,053 | 2/1986 | Strowik et al. | |
| 4,721,277 | 1/1988 | Hessler et al. | 248/394 X |
| 4,770,386 | 9/1988 | Hessler et al. | 248/396 X |

FOREIGN PATENT DOCUMENTS

| | | | |
|---|---|---|---|
| 2206884 | 2/1972 | Germany | 248/371 |
| 55-55023A | 4/1980 | Japan | 248/394 |
| 6-99769A | 4/1994 | Japan | 297/344.15 |
| 1403897 | 10/1971 | United Kingdom | 248/394 |
| 1493438 | 11/1977 | United Kingdom . | |
| 2118031 | 10/1983 | United Kingdom | 297/344.15 |

Primary Examiner—Ramon O. Ramirez
Assistant Examiner—Michael J. Turgeon
Attorney, Agent, or Firm—Leydig, Voit & Mayer

[57] ABSTRACT

A seat adjustment mechanism principally for vehicle seats comprises a frame connected to a base by front and rear linkages. A mechanism is provided that is operated by a handle with a first movement of the handle unlocking the front linkages to allow the tilt of the frame to be adjusted relative to the base and continued movement of the handle unlocking both linkages to allow the height of the frame to be adjusted relative to the base. This is achieved by successively pivoting lever arms that successively unlock the pairs of links.

21 Claims, 2 Drawing Sheets

SEAT ADJUSTMENT MECHANISMS

BACKGROUND TO THE INVENTION

The invention relates to seat adjustment mechanisms.

Many seats, particularly vehicle seats, are mounted on a frame connected to a base by linkages to allow the position of the seat to be adjusted relative to the base. For example, a mechanism may be provided that allows the height of the seat to be adjusted and/or a mechanism can be provided to allow the seat to be tilted.

SUMMARY OF THE INVENTION

According to the invention, there is provided a seat adjustment mechanism comprising a seat support frame carried on a base for movement relative thereto by first and second linkages, the first linkage being arranged towards a first end of the frame and a second linkage being arranged towards a second end of the frame, each linkage including a member engaging the frame and movable relative thereto during said movement of the frame, the members being acted on by a control mechanism which, in the first position, locks the members to the frame to fix the position of the frame relative to the base which, in a second position, releases one of the members to allow movement to the associated end of the frame relative to the base and which, in a third position, releases both members to allow movement of both ends of the frame relative to the base.

Each member may comprise a block slidable in an associated slot in the frame, the control mechanism either preventing or permitting said sliding movement to control the movement of the frame relative to the base.

The control mechanism may include a lever arm associated with each slot, each lever arm being urged into engagement with the associated block to prevent movement of the frame relative to the base, the control mechanism also including a control member operable selectively to disengage one or both of said lever arms from the respective block.

Each lever arm may be formed with teeth for engagement with at least one tooth on the associated block.

Each lever arm is preferably pivotally mounted on the frame.

In these arrangements, the control member may act on said one of said lever arms, a device being provided between the lever arms which transmits movement of one arm to the other arm only after said one lever arm has moved away from engagement with the associated block and beyond the first disengaged position.

In this case, said one lever arm may include a pair of stops and the other arm include a projection extending between said stops and engaging one of said stops when both lever arms engage respective blocks to prevent disengaging movement of said other lever arm, said one lever arm being movable to disengage from the associated block with lost motion between said one lever arm and the other lever arm until the other of said stops engages the projection when the one lever arm is moving away from said first disengaged position to disengage the other of said lever arms from the associated block.

Each lever arm may be formed by an elongate plate pivoted at one end to the frame, formed with teeth along an elongate side edge for engagement with a complementary formation on the associated block, said one lever arm having a U-shaped recess at the end thereof opposite the pivot, the limbs of said U-shaped recess forming said stops, the other lever arm having a projection at the end thereof opposite the pivot, the projection extending into said recess and being engaged by said limbs of said recess.

The control member preferably comprises a cam plate pivotal between the first position in which the plate prevents movement of said one lever arm from a position in which the lever arm engages the associated block to a second position, said movement moving said one lever arm to disengage said lever arm from the associated block.

The cam plate may include a latch which engages said one lever arm in said first position of the cam plate to prevent movement of said lever arm.

The cam plate may include a cam surface which, as the cam is pivoted from said first position to said second position, engages a follower on said one lever arm to move said lever arm.

The movement of the cam plate from said first position to said second position may move initially said first lever arm and then both said first lever arm and said second lever arm.

The cam plate may be pivoted by manual operation of a control handle.

Each linkage may comprise a pair of Y-shaped links formed by a main link pivotally connected at one to the base and having an end opposite to said one end slidable in an associated slot in said frame, and by a second link pivotally connected at one end to the associated main link intermediate the ends thereof and pivotally connected to said frame at an end opposite said one end, the Y-shaped links of each pair lying in parallel but spaced planes.

The main links of each pair may be interconnected by a rod.

Spring means may act on each pair of Y-shaped links to tend to close the angle between each main link and the associated second link, so tending to maintain the frame at a maximum spacing from said base.

The following is a more detailed description of an embodiment of the invention, by way of example, reference being made to the accompanying drawings in which:

DESCRIPTION OF THE PREFERRED EMBODIMENTS

Figure 1:
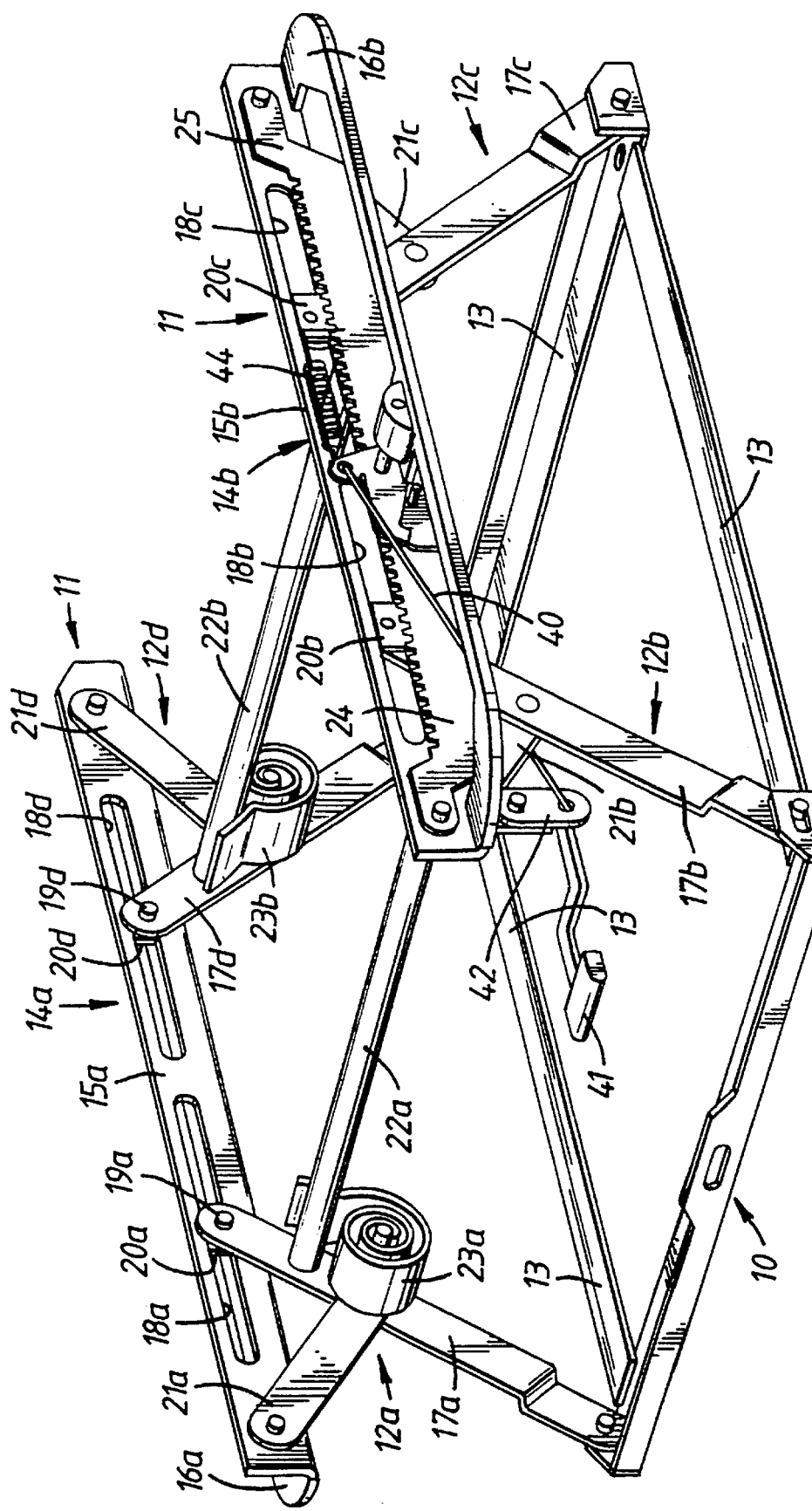
FIG. 1 is a perspective view of a seat adjustment mechanism.

Referring first to FIG. 1, the seat adjustment mechanism comprises a base indicated generally at 10, a frame indicated generally at 11 and two pairs of Y-shaped linkages indicated generally at 12a,12b,12c,12d connecting the frame 11 to the base 10.

The base 10 is generally rectangular in plan view and formed by four interconnected members 13. Since the seat adjustment mechanism is designed to be installed in a vehicle, the base 10 is for attachment to the floor of a vehicle.

The frame 11, which, in use, carries a vehicle seat (not shown), is formed by two parallel but spaced L-shaped side channels 14a,14b. Each channel 14a,14b has a vertical flange 15a,15b and a horizontal outwardly projecting flange 16a,16b. Each vertical flange 15a,15b is provided with a pair of aligned but spaced horizontal slots 18a,18b and 18c,18d for a purpose to be described below.

The Y-shaped linkages 12a,12b and 12c,12d of each pair are arranged in parallel planes so that one pair of linkages 12a,12b connect respective first ends of the channels 14a,14b to the base 10 (called the "front" end) and the other pair of linkages 12c,12d connect respective other ends of the channels 14a,14b to the base 10 (called the "rear" end).

Each Y-shaped linkage 12a,12c, or 12d comprises a main link 17a,17b,17c,17d pivotally connected to a respective corner of the frame 10 at a lower end and carrying a pin 19a,19b,19c,19d at its opposite, upper, end which projects into an associated one of the slots 18a,18b,18c,18d and carries a slider block 20a,20b,20c,20d guided for sliding movement along the associated slot 18a,18b,18c,18d. Each Y-shaped linkage 12a,12b,12c,12d also includes a second link 21a,21b,21c,21d pivotally connected at one end intermediate the ends of the associated main link 17a,17b,17c, 17d and pivotally connected at the other end to an associated channel 14a,14b adjacent an end of the channel 14a,14b.

A rod 22a,22b extends between the main links 17a,17b and 17c,17d of each pair of links in a direction normal to the planes of the links of each pair. The rod 22a,22b thus constrains the associated linkages 12a,12b,12c,12d of each pair to move together.

Each pair of Y-shaped lever arms 12a,12b,12c,12d is provided with a coil spring 23a,23b having one end connected to the associated rod 22a,22b and the other end connected to a rod (not shown) carried by one of the second links 21a,21d at the pivotal connection between the second link 21a,21d and the associated main link 17a,17d. The coil spring 23a,23b provides a torque that tends to close the angle between the second links 21a,21b,21c,21d and the associated main links 17a,17b,17c,17d so tending to hold the channels 14a,14b at a maximum spacing from the base 10. This movement is limited only by engagement of the slider blocks 20a,20b,20c,20d with an end of the associated slots 18a,18b,18c,18d.

Figure 2:
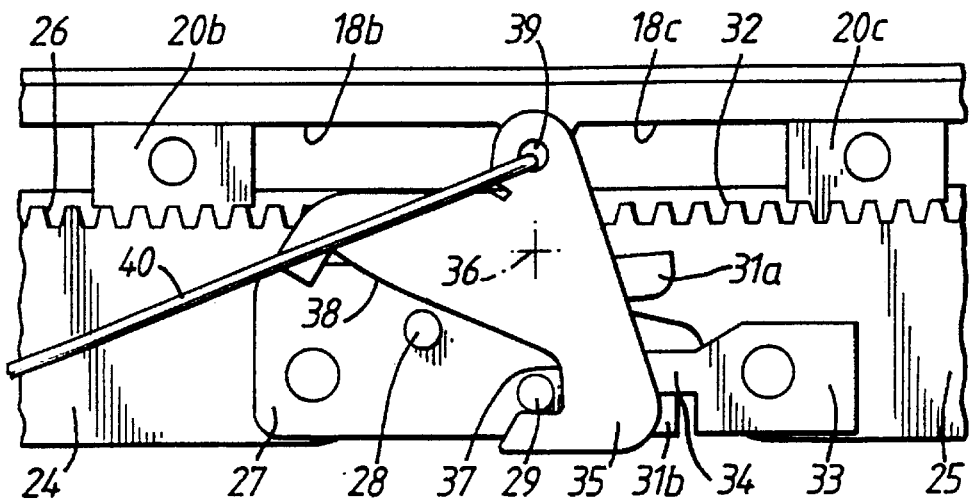
FIG. 2 is a side elevation of a part of the seat adjustment mechanism of FIG. 1 showing a cam plate latching to a first lever arm of the mechanism.
Figure 3:
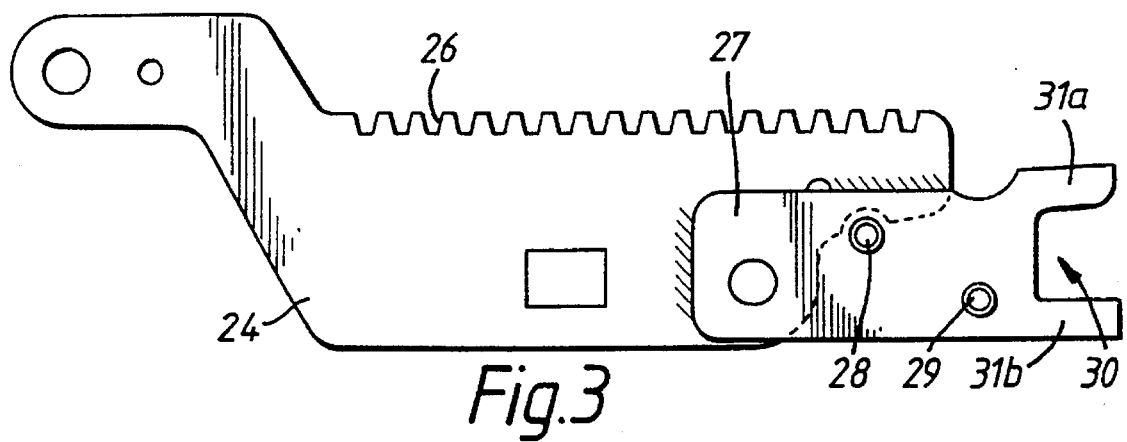
FIG. 3 is a side elevation of the first lever arm of the mechanism of FIGS. 1 and 2.
Figure 4:
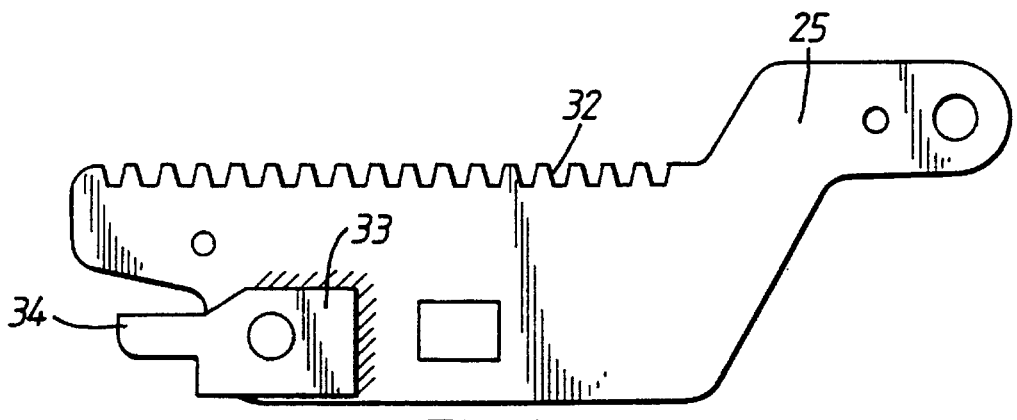
FIG. 4 is a side elevation of a second lever arm of the mechanism of FIGS. 1 and 2.

Referring now additionally to FIGS. 2, 3, and 4, one of the channels 14b carries a mechanism that allows both the tilt and the height of both channels 14a,14b to be adjusted relative to the base 10. The mechanism includes first and second lever arms 24,25. As best seen in FIG. 3, the first lever arm 24 is an elongate platelike member which, at one end, is pivotally connected to the vertical flange 15b of the associated channel 14b adjacent the front end of the channel 14b. The arm 24 is then cranked in its own plane and after the crank an upper edge of the lever arm 24 is provided with a plurality of teeth 26. In the position of the lever arm 24 shown in FIG. 1, these teeth 26 engage corresponding teeth on the slider block 20b in the adjacent slot 18b.

The end of the first lever arm 24 remote from the pivot carries a latch member 27 in the form of a generally rectangular plate carrying two horizontally projecting pins 28,29 and formed at its free end with a U-shaped recess 30 bounded by a pair of upper and lower spaced limbs 31a,31b.

The second lever arm 25 is generally a mirror image of the first lever arm being provided with a similarly arranged pivot crank and teeth 32 which engage with cooperating teeth on the slider block 20c in the associated slot 18c in the position of the second lever arm 25 shown in FIG. 1. However, the second lever arm 25 carries a latch member 33 which, while rectangular, is provided at its free end with a single projection 34.

The first end second lever arms 24,25 are interconnected by a helical spring 44 which tends to pivot the arms 24,25 in an upward direction.

As best seen in FIG. 2, in the position of the first and second lever arms 24,25 shown in FIG. 1, the projection 34 of the second arm 25 extends into the U-shaped recess 30 at the end of the first operating arm 24 with the projection 34 engaging the lowermost limb 31b.

The vertical flange 15b of this channel 14b also carries an operating member in the form of a cam plate 35 which is generally triangular in shape and mounted for pivotal movement about a horizontal axis 36. One corner of the cam plate 35 defines a hook-shaped catch 37 which, in the position of the first and second lever arms 24,25 shown in FIG. 2, receives the pin 29 on the latch member 27 of the first lever arm 24. An upwardly inclined cam surface 38 extends away from the catch 37 to a next adjacent corner of the cam plate 35.

The cam plate 35 also has an upper corner provided with a hole 39 which receives one end of an operating rod 40 whose other end is, connected to an operating handle 41 best seen in FIG. 1 and carried for pivotal movement on a mounting 42 depending from channel 14b. The arrangement is such that upward pivotal movement of the handle 41 causes anti-clockwise rotation of the cam plate 35, as viewed in FIG. 2.

The seat adjustment mechanism operates as follows.

In the position of the first and second lever arms 24,25 shown in FIGS. 1 and 2, the channels 14a,14b are locked relative to the base 10. This is achieved by pin 29 engaging in the catch 37 so holding the first lever arm 24 in a position in which the associated teeth 26 engage the associated slider block 20b. Since the projection 34 on the second lever arm 25 engages the lower limb 31b of the recess 30 on the first lever arm 24, the second lever arm 25 is also prevented from pivoting thus holding the second lever arm 25 in a position in which its teeth 32 engage the teeth on the associated slider block 20c. Since the slider blocks 20b,20c cannot slide, the angle between the main links 17a,17b,17c and 17d and the second links 21a,21b,21c,21d is fixed so preventing relative movement between the channels 14a,14b and the base 10. Thus the height and tilt of the channels 14a,14b are fixed relative to the base 10.

If the handle 41 is pivoted upwardly, the cam plate 35 begins to rotate about the horizontal axis 36. As pin 29 clears the catch 37, the first lever arm 24 is released for movement. At the same time, pin 28 contacts the cam surface 38 and continued rotation of the cam plate 35 causes the cam surface 38 to press downwardly on pin 28 so pivoting the first lever arm 24 downwardly. This disengages the teeth 26 from the associated slider block 20b.

During this movement of the first lever arm 24, there is no movement of the second lever arm 25 because of the lost motion provided by the recess 30. Although the projection 34 disengages from the lower limb 31b, it moves in the space between the limbs 31a,31b.

The engagement of the projection 34 with the upper limb 31a can be felt during operation of the handle 41. If rotation of the handle 41 is halted in this position, the tilt of the channels 14a,14b (and thus the tilt of the front of an associated seat) relative to the base 10 can be adjusted by either applying downward pressure on the frame 11 or by releasing the downward pressure to allow the front Y-shaped links to close under the action of the associated coil spring 23a,23b. When a required tilt is achieved, the handle 41 can be pivoted in a reverse direction so disengaging the cam surface 38 from the pin 29 and allowing the first lever arm 24 to perform a reverse pivotal movement under the action of the spring 44. This reverse pivotal movement brings the teeth 26 on the first lever arm 24 into engagement with the teeth on the associated slider block 20b so preventing further movement of the slider block 20b and holding the frame 11 at the desired tilt relative to the base 10. When the handle has performed full reverse pivotal movement, the catch 37 will re-engage pin 29 to lock the first lever arm 24 in this position.

It is also possible, however, either continuously or subsequently to pivot the handle 41 upwardly to continue rotation of the cam plate 35 beyond the position at which the projection 34 contacts the upper limb 31a. If this is done, the cam surface 38 continues to press down on pin 28 and so continues downward pivotal movement of the lever arm 24. The effect of this is to cause the upper limb 31a to engage the projection 34 and cause downward pivotal rotation of the second lever arm 25 to disengage the teeth 32 on this lever arm 25 from the associated slider block 20c. When this occurs, both blocks 20b,20c are released for sliding movement in their associated slots 18b,18c and the height of the frame 11 relative to the base 10 can be adjusted either by applying a downward pressure to the frame 11 or by removing such pressure to allow upward movement of the frame 11 under the action of the coil springs 23a,23b.

When the frame 11 is at a required height, reverse rotation of the handle 41 initially allows the first lever arm 24 to rotate upwardly under the action of the spring 44 and then, as the lower limb 31b engages the projection 34, it also allows the first and second lever arms 24,25 to pivot upwardly together until their respective teeth 26,32 engage the associated slider blocks 20b,20c. When in this position, the front and rear pairs of Y-shaped linkages 12 are locked and the height of the frame 11 is fixed relative to the base 10. Finally, the catch 37 engages pin 29 to lock the first and second lever arms 24,25 in this position.

In this way, a single mechanism controls both tilting and height of the frame 11 relative to the base 10. The frame 11 can be adjusted for tilt only or for height only or for tilt and height.

It will be appreciated that the engagement between the first and second arms 24,25 and the associated slider blocks 20a,20b need not be by means of teeth; it could be by means of any suitable inter-engaging parts. In addition, the catch and pin 37,28 could be omitted, although its presence is desirable as a safety feature. Alternatively, it could be replaced by any suitable alternative catch mechanism.

The latch members 27,33 are primarily provided so that the manufacturing costs of the arms are reduced—because the arms 24,25 themselves are identical. It will be appreciated, however, that the recess 30 and the limbs 31a, 31b could be formed integrally with the first arm 24 and the projection 34 formed integrally with the second arm 25.

The cam plate 35 could be rotated in any way; for example, it could be rotated by a motor.

The linkages 12a,12b,12c,12d need not be Y-shaped; they could be of any suitable arrangement that allows the appropriate adjustment and provides a member that can be locked and unlocked to lock and unlock the linkage.

The first and second arms 24,25 are shown as pivoting but they could be mounted for rectilinear movement. The lost motion between the first and second arms 24,25 need not be by means of the recess 30 and the projection 34; it could be by any suitable means such as a pin and a slot.

What I claim is:

1. A seat adjustment mechanism comprising a seat support frame carried on a base for movement relative thereto by first and second linkages, the first linkage being arranged towards a first end of the frame and a second linkage being arranged towards a second end of the frame, each linkage including a member engaging the frame and movable relative thereto during the movement of the frame, the members being acted on by a control mechanism which, in a first position, locks the members to the frame to fix the position of the frame relative to the base and which, in a second position, releases one of the members to allow movement to only the associated end of the frame relative to the base and which, in a third position, releases both members to allow movement of both ends of the frame relative to the base.

2. A mechanism according to claim 1 wherein each member comprises a block slidable in an associated slot in the frame, the control mechanism either preventing or permitting sliding of the blocks to control the movement of the frame relative to the base.

3. A mechanism according to claim 2 wherein the control mechanism includes first and second lever arms each associated with one of the blocks, each lever arm being urged into engagement with the associated block to prevent movement of the frame relative to the base, the control mechanism also including a control member operable selectively to disengage one or both of the lever arms from the associated block.

4. A mechanism according to claim 3 wherein each lever arm is formed with teeth for engagement with at least one tooth on the associated block.

5. A mechanism according to claim 3 wherein each lever arm is pivotally mounted on the frame.

6. A mechanism according to claim 3 wherein the control member acts on one of the lever arms, a device being provided between the lever arms which transmits movement of the first lever arm to the second lever arm only after the first lever arm has moved away from engagement with the associated block and beyond a first disengaged position in which the first lever arm is disengaged from the associated block.

7. A mechanism according to claim 6 wherein the first lever arm includes a pair of stops and the second lever arm includes a projection extending between the stops and engaging one of the stops when both lever arms engage the associated blocks to prevent disengaging movement of the second lever arm, the first lever arm being movable to disengage from the associated block with lost motion between the first lever arm and the second lever arm until the other of the stops engages the projection when the first lever arm is moving away from the first disengaged position to disengage the second lever arm from the associated block.

8. A mechanism according to claim 6 wherein each lever arm is formed by an elongate plate pivoted at one end to the frame and formed with teeth along an elongate side edge for engagement with a complementary formation on the associated block, the first lever arm having a pair of spaced opposing limbs defining a U-shaped recess at the end thereof opposite the pivot, the limbs forming the stops, the second lever arm having a projection at the end thereof opposite the pivot, the projection extending into the recess and being engaged by the limbs of the first lever arm.

9. A mechanism according to claim 6 wherein the control member comprises a cam plate pivoting between a first position in which the can plate prevents movement of the first lever arm from a position in which the first lever arm engages the associated block to a second position, movement of the cam plate from the first position to the second position moving the first lever arm to disengage the first lever arm from the associated block.

10. A mechanism according to claim 9 wherein the cam plate includes a latch which engages the first lever arm in the first position of the cam plate to prevent movement of the first lever arm.

11. A mechanism according to claim 10 wherein the cam plate includes a cam surface which, as the cam plate is pivoted from the first position to the second position, engages a follower on the first lever arm to move the first lever arm.

12. A mechanism according to claim 9 wherein the movement of the cam plate from said first position to said second position moves initially said first lever arm and then both said first lever arm and said second lever arm.

13. A mechanism according to claim 9 wherein the cam plate is pivoted by manual operation of a control handle.

14. A mechanism according to claim 11 wherein each linkage comprises a pair of Y-shaped links formed by a main link pivotally connected at one end to the base and having an end opposite to the one end slidable in an associated slot in the frame, and by a second link pivotally connected at one end to the associated main link intermediate the ends thereof and pivotally connected to the frame at an end opposite the one end, the Y-shaped links of each pair lying in parallel but spaced planes.

15. A mechanism according to claim 14 wherein the main links of each pair are interconnected by a rod.

16. A mechanism according to claim 14 wherein spring means act on each pair of Y-shaped links to tend to close the angle between each main link and the associated second link, so tending to maintain the frame at a maximum spacing from said base.

17. A seat adjustment mechanism comprising a seat support frame, a base supporting the frame for movement relative to the base, first and second links, each link having a first end pivotably connected to the base and a second end, first and second blocks pivotably connected to the second ends of the first and second links, respectively, each block being connected to the frame for translation with respect to the frame in a lengthwise direction of the frame, and first and second levers pivotably mounted on the frame and movable into and out of engagement with the first and second blocks, respectively, to releasably lock the blocks against movement in the lengthwise direction of the frame.

18. A mechanism according to claim 17 wherein each block is slidably received in a slot in the frame.

19. A mechanism according to claim 17 further comprising a third link having an end pivotably connected to the first link and an end pivotably connected to the frame, and a fourth link having an end pivotably connected to the second link and an end pivotably connected to the frame.

20. A mechanism according to claim 17 wherein each lever includes a linear portion having teeth formed thereon, and each block is lockingly engageable with the teeth on one of the levers.

21. A mechanism according to claim 17 further comprising a control mechanism operatively connected to the levers and having a first position in which each lever is engaged with the respective block, a second position in which one of the levers is engaged with and one of the levers is disengaged from the respective block, and a third position in which each lever is disengaged from the respective block.

* * * * *